(12) United States Patent
Shimizu et al.

(10) Patent No.: US 12,169,312 B2
(45) Date of Patent: Dec. 17, 2024

(54) SEMICONDUCTOR PACKAGE

(71) Applicant: IBIDEN CO., LTD., Gifu (JP)

(72) Inventors: Keisuke Shimizu, Ogaki (JP); Tomoyuki Ikeda, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 99 days.

(21) Appl. No.: 17/752,936

(22) Filed: May 25, 2022

(65) Prior Publication Data

US 2022/0404564 A1  Dec. 22, 2022

(30) Foreign Application Priority Data

Jun. 16, 2021 (JP) .................. 2021-100307

(51) Int. Cl.
*G02B 6/42* (2006.01)

(52) U.S. Cl.
CPC ........... *G02B 6/4214* (2013.01); *G02B 6/428* (2013.01)

(58) Field of Classification Search
CPC ...................................................... G02B 6/42
USPC ............................................................ 385/31
See application file for complete search history.

(56) References Cited

U.S. PATENT DOCUMENTS

| | | | | |
|---|---|---|---|---|
| 6,690,845 B1* | 2/2004 | Yoshimura | ............. | G02B 6/124 257/E25.032 |
| 9,971,111 B1* | 5/2018 | Hsu | ....... | G02B 6/4221 |
| 9,989,713 B1* | 6/2018 | Cyr | ....... | G02B 6/4214 |
| 10,018,781 B1* | 7/2018 | Masuda | ............... | G02B 6/4249 |
| 10,025,044 B1* | 7/2018 | Masuda | ............... | G02B 6/4245 |
| 10,690,867 B1* | 6/2020 | Masuda | ............... | G02B 6/4246 |
| 11,630,270 B2* | 4/2023 | Iida | ......... | H01L 24/00 372/50.1 |
| 2006/0251360 A1* | 11/2006 | Lu | ........ | G02B 6/4292 385/88 |
| 2011/0133063 A1* | 6/2011 | Ji | .......... | G02B 6/122 250/227.24 |
| 2014/0334768 A1* | 11/2014 | Chang | ................. | G02B 6/4204 438/27 |
| 2016/0073544 A1* | 3/2016 | Heyd | ...................... | G06F 1/185 361/679.31 |
| 2019/0219777 A1* | 7/2019 | Yakabe | ................ | G02B 6/4204 |
| 2020/0183059 A1* | 6/2020 | Masuda | ............... | G02B 3/0075 |

(Continued)

FOREIGN PATENT DOCUMENTS

| JP | 2002-329891 A | 11/2002 |
|---|---|---|
| JP | 4845333 B2 * | 12/2011 |

*Primary Examiner* — Kaveh C Kianni
(74) *Attorney, Agent, or Firm* — Oblon, McClelland, Maier & Neustadt, L.L.P.

(57) ABSTRACT

A semiconductor package includes a printed wiring board, a logic IC mounted on the printed wiring board, a connector mounted on the printed wiring board, an optical element that is accommodated inside the printed wiring board and converts an optical signal to an electrical signal and/or the electrical signal to the optical signal, an optical waveguide formed between the optical element inside the printed wiring board and the connector on the printed wiring board such that the optical waveguide optically connects the optical element and the connector, and an electrical path formed between the optical element and the logic IC such that the electrical path connects the logic IC and the optical element and that a length of the electrical path is 1 mm or less.

20 Claims, 3 Drawing Sheets

(56) References Cited

U.S. PATENT DOCUMENTS

2022/0223494 A1\* 7/2022 Lee .................. F28D 15/04
2022/0384326 A1\* 12/2022 Yang ................. H01L 25/50

\* cited by examiner

SEMICONDUCTOR PACKAGE

CROSS-REFERENCE TO RELATED APPLICATIONS

The present application is based upon and claims the benefit of priority to Japanese Patent Application No. 2021-100307, filed Jun. 16, 2021, the entire contents of which are incorporated herein by reference.

BACKGROUND OF THE INVENTION

Field of the Invention

A technology disclosed herein relates to a semiconductor package.

Description of Background Art

Japanese Patent Application Laid-Open Publication No. 2002-329891 describes an IC chip mounting substrate in which an optical element and an IC chip are mounted on a surface of a substrate. The entire contents of this publication are incorporated herein by reference.

SUMMARY OF THE INVENTION

According to one aspect of the present invention, a semiconductor package includes a printed wiring board, a logic IC mounted on the printed wiring board, a connector mounted on the printed wiring board, an optical element that is accommodated inside the printed wiring board and converts an optical signal to an electrical signal and/or the electrical signal to the optical signal, an optical waveguide formed between the optical element inside the printed wiring board and the connector on the printed wiring board such that the optical waveguide optically connects the optical element and the connector, and an electrical path formed between the optical element and the logic IC such that the electrical path connects the logic IC and the optical element and that a length of the electrical path is 1 mm or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
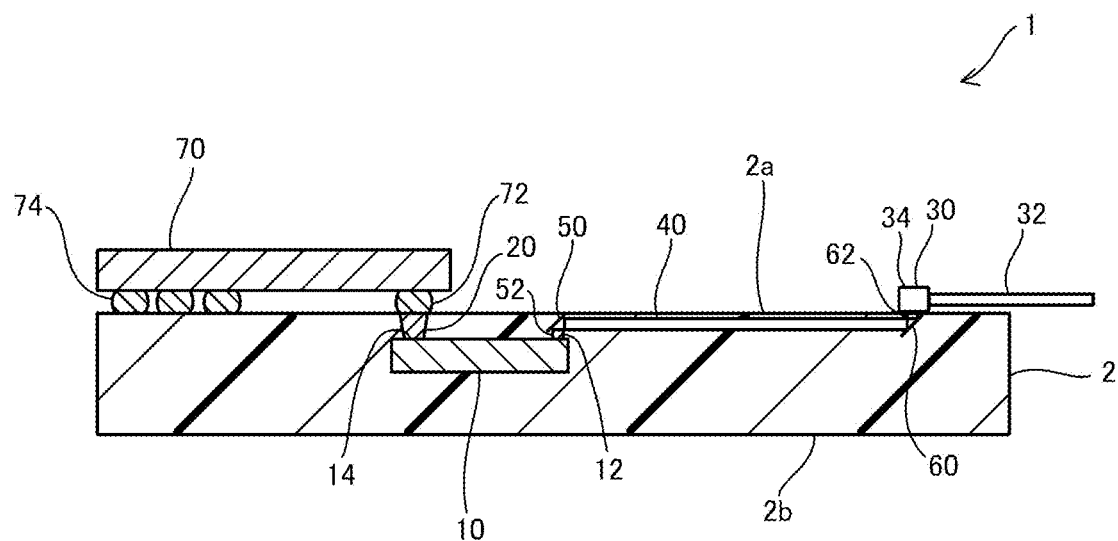
FIG. 1 is a cross-sectional view schematically illustrating a semiconductor package according to an embodiment of the present invention.

Embodiments will now be described with reference to the accompanying drawings, wherein like reference numerals designate corresponding or identical elements throughout the various drawings.

Embodiment

FIG. 1 is a cross-sectional view illustrating a semiconductor package 1 according to an embodiment of the present invention. The semiconductor package 1 includes a printed wiring board 2, an optical element 10, a connector 30, an optical waveguide 40, and a logic IC 70.

The printed wiring board 2 is, for example, a wiring board including a build-up layer formed by alternately laminating conductor layers and resin insulating layers on a core substrate. The printed wiring board 2 has a first surface (2a) and a second surface (2b) on the opposite side with respect to the first surface (2a). An electronic component such as the logic IC 70 is mounted on the first surface (2a). The second surface (2b) is a surface for mounting the printed wiring board 2 on a motherboard (not illustrated in the drawings). The resin insulating layers are formed using a thermosetting resin. The resin insulating layers may contain inorganic particles such as silica particles, or may contain a reinforcing material such as a glass cloth. The conductor layers are formed mainly using copper. The conductor layers include wirings and the like (not illustrated in the drawings). The printed wiring board 2 has a thickness of, for example, about 1 mm. The printed wiring board 2 may have a thickness of 1 mm or more and 1.5 mm or less.

The optical element 10 is a component that converts an optical signal and an electrical signal. In the embodiment, the optical element 10 converts an input optical signal into an electrical signal and outputs the electrical signal (optical-electrical conversion), and converts an input electrical signal into an optical signal and outputs the optical signal (electrical-optical conversion). The optical element 10 can perform both optical-electrical conversion and electrical-optical conversion. The optical element 10 includes a light receiving element that performs optical-electrical conversion, a light emitting element that performs electrical-optical conversion, and a control circuit that controls conversion between an optical signal and an electrical signal. The light receiving element is, for example, a photodiode. The light emitting element is, for example, a laser diode. The optical element 10 includes an optical input-output part 12 for inputting or outputting an optical signal and an electrical input-output part 14 for inputting or outputting an electrical signal. In a modified embodiment, the optical element 10 may be a component that performs only one of optical-electrical conversion and electrical-optical conversion.

The optical element 10 is built in on the first surface (2a) side of the printed wiring board 2. The entire optical element 10 is built in the printed wiring board 2. The optical input-output part 12 and the electrical input-output part 14 are positioned facing the first surface (2a). A light transmitting member 52 (to be described later) is embedded in the printed wiring board 2 on the optical input-output part 12. A metal post 20 is formed in the printed wiring board 2 on the electrical input-output part 14. The metal post 20 is electrically connected to the electrical input-output part 14. An upper surface of the metal post 20 is exposed on the first surface (2a).

The connector 30 is a component that connects an optical waveguide (optical fiber). In the embodiment, the connector 30 is mounted on the first surface (2a) of the printed wiring board 2. The connector 30 includes an optical fiber 32 and a housing 34. The optical fiber 32 is a member that transmits an optical signal. The optical fiber 32 has a length of, for example, 100 mm or more. The housing 34 is connected to an end part of the optical fiber 32. The housing 34 can be mounted on the first surface (2a). In the housing 34, a path (not illustrated in the drawings) is formed for guiding an optical signal output from the end part of the optical fiber 32 and guiding an optical signal input to the housing 34 to the end part of the optical fiber 32.

The optical waveguide 40 is a transmission path formed of a member that transmits an optical signal. The optical waveguide 40 is formed of an optical fiber. The optical waveguide 40 is formed between the optical element 10 and the connector 30. The optical waveguide 40 optically connects the optical element 10 and the connector 30. The optical waveguide 40 is built in on the first surface (2a) side of the printed wiring board 2. The optical waveguide 40 extends along the first surface (2a). The optical waveguide 40 has a length of 30 mm or more and 70 mm or less. In a modified embodiment, the length of the optical waveguide 40 may be 70 mm or more, or may be 30 mm or less.

A first mirror 50 and the light transmitting member 52 are provided between the optical waveguide 40 and the optical element 10. The light transmitting member 52 is a member that transmits an optical signal. The light transmitting member 52 is, for example, an optical pin formed of a transparent resin. The light transmitting member 52 is provided on an upper side of the optical input-output part 12 of the optical element 10. The optical input-output part 12 and the light transmitting member 52 are optically connected.

The first mirror 50 is a reflection member for changing a transmission direction of an optical signal transmitted between the optical waveguide 40 and the optical element 10. The first mirror 50 is positioned between an end part of the optical waveguide 40 and the light transmitting member 52. Therefore, the optical waveguide 40 is optically connected to the optical element 10 via the first mirror 50. An optical signal output from the end part of the optical waveguide 40 is changed in transmission direction by the first mirror 50 and is input to the optical input-output part 12 of the optical element 10 via the light transmitting member 52. Conversely, an optical signal output from the optical input-output part 12 of the optical element 10 is changed in transmission direction by the first mirror 50 and is input to the end part of the optical waveguide 40 via the light transmitting member 52.

A second mirror 60 and a light transmitting member 62 are provided between the optical waveguide 40 and the connector 30. The light transmitting member 62 is a member that transmits an optical signal. The light transmitting member 62 is, for example, an optical pin formed of a transparent resin. The light transmitting member 62 is provided in the printed wiring board 2 on a lower side of the housing 34 of the connector 30. The housing 34 and the light transmitting member 62 are optically connected.

The second mirror 60 is a reflection member for changing a transmission direction of an optical signal transmitted between the optical waveguide 40 and the connector 30. The second mirror 60 is positioned between an end part of the optical waveguide 40 and the light transmitting member 62. Therefore, the optical waveguide 40 is optically connected to the connector 30 via the second mirror 60. An optical signal output from the end part of the optical waveguide 40 is changed in transmission direction by the second mirror 60 and is input to the connector 30 via the light transmitting member 62. Conversely, an optical signal output from the connector 30 is changed in transmission direction by the second mirror 60 and is input to the end part of the optical waveguide 40 via the light transmitting member 62.

The logic IC 70 is an IC chip that operates depending on an electrical signal. The logic IC 70 is, for example, a CPU. The logic IC 70 is mounted on the first surface (2a) of the printed wiring board 2. The logic IC 70 is mounted above a part of the optical element 10 in the printed wiring board 2. When the logic IC 70 and the optical element 10 are projected onto the first surface (2a) with light perpendicular to the first surface (2a), the logic IC 70 and the optical element 10 partially overlap. The logic IC 70 is mounted on the first surface (2a) via solder bumps (72, 74). The solder bump 72 is electrically connected to the upper surface of the metal post 20 exposed on the first surface (2a). Therefore, the logic IC 70 is electrically connected to the optical element 10 via the solder bump 72 and the metal post 20. The logic IC 70 and the optical element 10 can transmit an electrical signal to each other via the solder bump 72 and the metal post 20. The logic IC 70 operates using an electrical signal input (received) from the optical element 10 and outputs (transmits) an electrical signal to the optical element 10. The solder bump 74 is electrically connected to another metal post on the first surface (2a) (not illustrated in the drawings).

Figure 2:
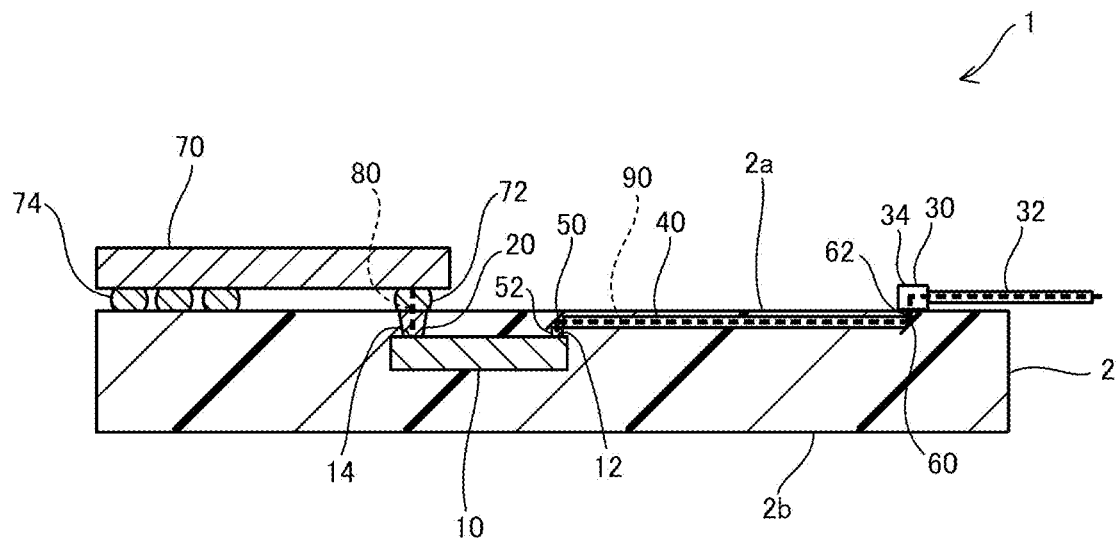
FIG. 2 is a cross-sectional view schematically illustrating an electrical path and an optical path in a semiconductor package according to an embodiment of the present invention.

FIG. 2 illustrates an electrical path 80 and an optical path 90 in the semiconductor package 1 of the embodiment. In the semiconductor package 1 of the embodiment, an electrical signal is transmitted between the electrical input-output part 14 of the optical element 10 and the logic IC 70 via the electrical path 80. The electrical path 80 is formed by the metal post 20 and the solder bump 72. The electrical path 80 has a length of, for example, 1 mm or less. The length of the electrical path 80 may be 30 μm or more and 500 μm or less.

In the semiconductor package 1 of the embodiment, an optical signal is transmitted between the optical fiber 32 of the connector 30 and the optical input-output part 12 of the optical element 10 via the optical path 90. The optical path 90 is formed by the light transmitting member 52, the first mirror 50, the optical waveguide 40, the second mirror 60, the light transmitting member 62, the housing 34, and the optical fiber 32. A total length of the optical path 90 varies depending on a length of the optical fiber 32.

In the semiconductor package 1 of the embodiment, the optical element 10 is built in on the first surface (2a) side, and the logic IC 70 is mounted on the first surface (2a). Therefore, the electrical path 80 between the optical element 10 and the logic IC 70 has a length of 1 mm or less. The length of the electrical path 80 is made shorter than the length of the electrical path in the conventional semiconductor package. Therefore, according to the semiconductor package 1 of the embodiment, a transmission loss is smaller than that of the conventional semiconductor package.

Method for Manufacturing Semiconductor Package

A method for manufacturing a semiconductor package 1 according to an embodiment of the present invention is described. The semiconductor package 1 of an embodiment is formed by the following processes. The printed wiring board 2 is formed by alternately laminating conductor layers and resin insulating layers on a core substrate. Recesses for accommodating the optical element 10 and the optical waveguide 40 are formed on the first surface (2a) side of the printed wiring board 2. The optical element 10 and the optical waveguide 40 are positioned in the formed recesses. In this case, the light transmitting member 52, the first mirror 50, the second mirror 60, and the light transmitting member 62 are also positioned in the recesses.

After that, a resin insulating layer is formed on the optical element 10 and the optical waveguide 40 positioned in the recesses. The optical element 10 and the optical waveguide 40 are optically connected via the first mirror 50 and the light transmitting member 52.

An opening exposing the electrical input-output part 14 of the optical element 10 is formed in the resin insulating layer on the optical element 10. The metal post 20 is formed on the electrical input-output part 14 exposed from the opening. The metal post 20 is formed by forming an electrolytic plating film on a seed layer. The metal post 20 is exposed on the first surface (2a).

The logic IC 70 is mounted on the first surface (2a) of the printed wiring board 2 via the solder bumps (72, 74). The solder bump 72 is electrically connected to the upper surface of the metal post 20 exposed on the first surface (2a). As a result, the electrical path 80 (FIG. 2) between the optical element 10 and the logic IC 70 is formed.

The connector 30 is mounted on the first surface (2a) of the printed wiring board 2. The housing 34 of the connector 30 is secured on the light transmitting member 62. The connector 30 and the optical waveguide 40 are optically connected via the second mirror 60 and the light transmitting member 62. As a result, the optical element 10 and the connector 30 are optically connected by the optical waveguide 40. The semiconductor package 1 of the embodiment is obtained.

First Modified Embodiment

Figure 3:
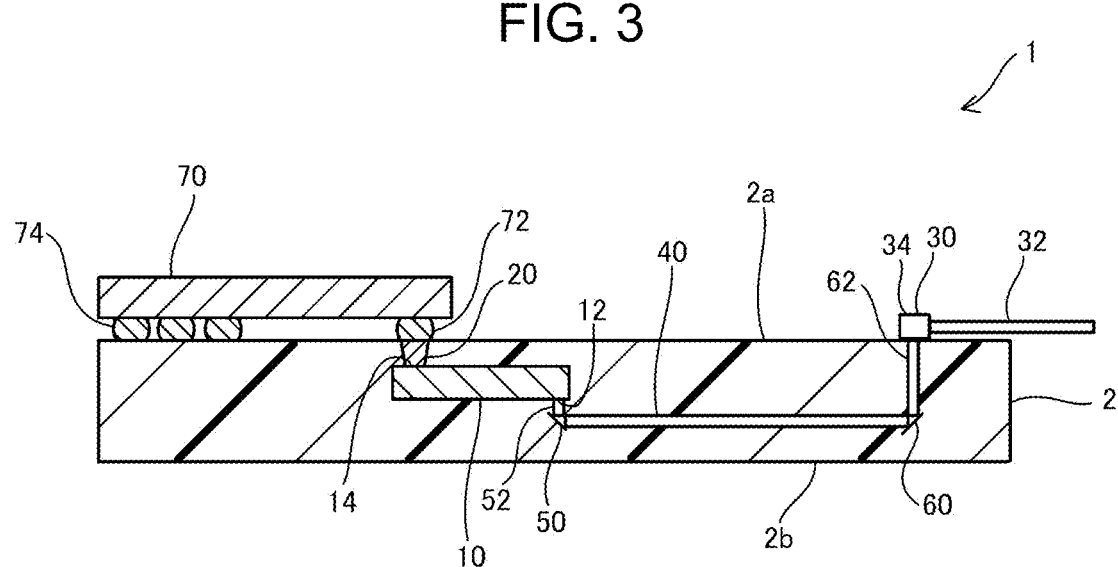
FIG. 3 is a cross-sectional view schematically illustrating a semiconductor package according to a first modified embodiment of the present invention.

FIG. 3 illustrates a first modified embodiment of the embodiment. The first modified embodiment is different from the embodiment in that the optical input-output part 12 of the optical element 10 is positioned facing the second surface (2b). The optical input-output part 12 is positioned facing downward. The optical waveguide 40 is built in at a position closer to the second surface (2b) than the optical element 10 is. The first mirror 50 and the light transmitting member 52 are provided between the optical waveguide 40 and the optical element 10. The light transmitting member 52 is provided on a lower side (the second surface (2b) side) of the optical input-output part 12. The first mirror 50 is positioned between an end part of the optical waveguide 40 and the light transmitting member 52. The optical waveguide 40 is optically connected to the optical element 10 via the first mirror 50.

The second mirror 60 and the light transmitting member 62 are provided between the optical waveguide 40 and the connector 30. In the first modified embodiment, the light transmitting member 62 is longer than the light transmitting member 62 of the embodiment. The second mirror 60 is positioned between an end part of the optical waveguide 40 and the light transmitting member 62. The optical waveguide 40 is optically connected to the connector 30 via the second mirror 60.

Figure 4:
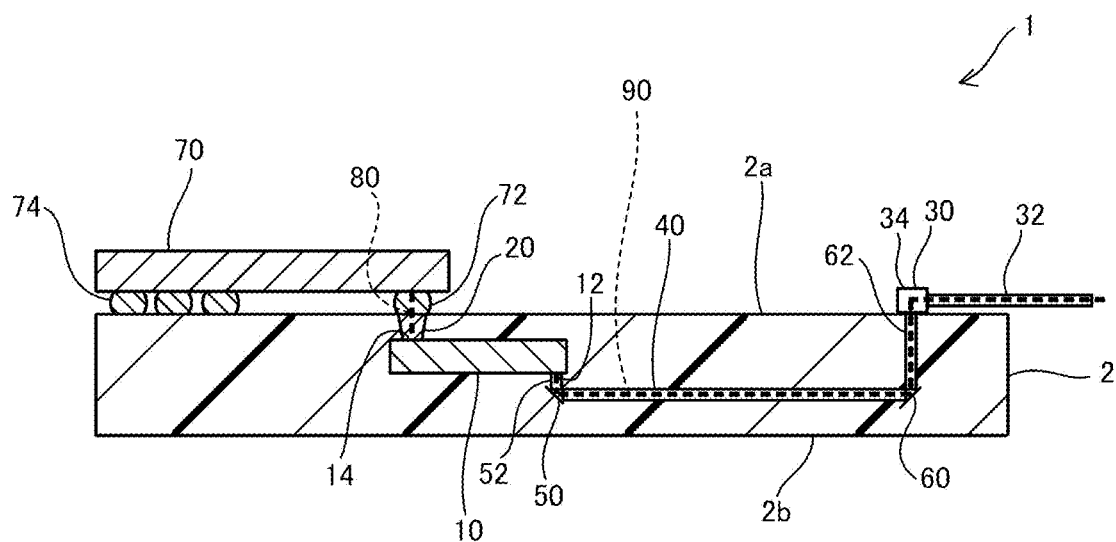
FIG. 4 is a cross-sectional view schematically showing an electrical path and an optical path in the semiconductor package of the first modified embodiment according to an embodiment of the present invention.

FIG. 4 illustrates the electrical path 80 and the optical path 90 in the semiconductor package 1 of the first modified embodiment. The electrical path 80 is formed by the metal post 20 and the solder bump 72. The electrical path 80 has a length of, for example, 1 mm or less. The length of the electrical path 80 may be 30 μm or more and 500 μm or less. The optical path 90 is formed by the light transmitting member 52, the first mirror 50, the optical waveguide 40, the second mirror 60, the light transmitting member 62, the housing 34, and the optical fiber 32. In the first modified embodiment, the optical path 90 extends along the first surface (2a) at a position on a lower side (the second surface (2b) side) the optical element 10.

Second Modified Embodiment

Figure 5:
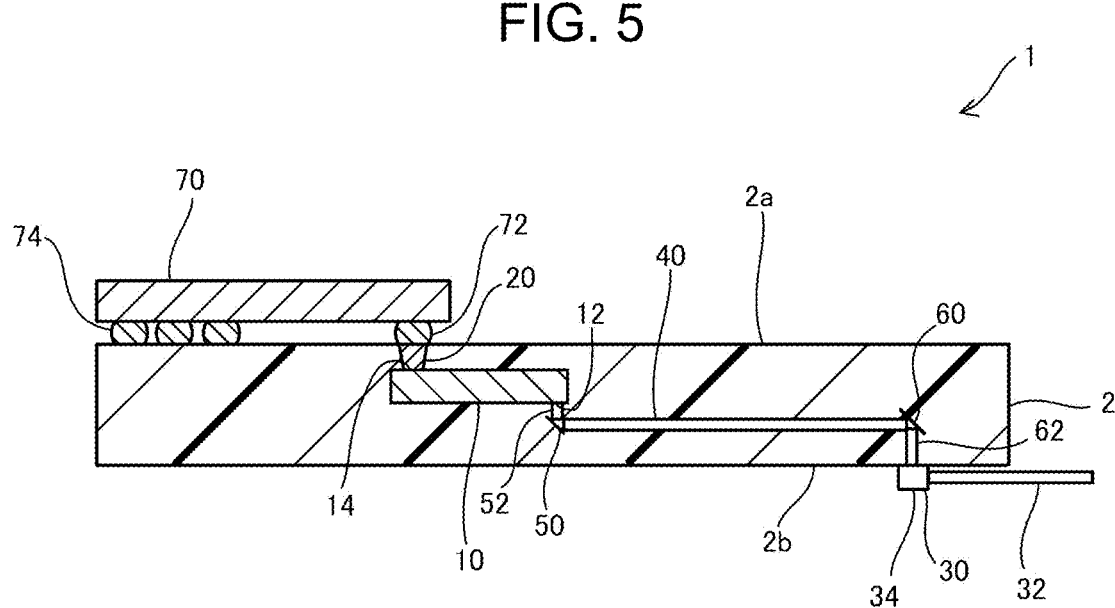
FIG. 5 is a cross-sectional view schematically illustrating a semiconductor package according to a second modified embodiment of the present invention.

FIG. 5 illustrates a second modified embodiment of the embodiment. The second modified embodiment is another example of the first modified embodiment. The second modified embodiment is different from the first modified embodiment in that the connector 30 is mounted on the second surface (2b). The optical waveguide 40 is built in at a position closer to the second surface (2b) than the optical element 10 is. The first mirror 50 and the light transmitting member 52 are provided between the optical waveguide 40 and the optical element 10. The light transmitting member 52 is provided on a lower side (the second surface (2b) side) of the optical input-output part 12. The first mirror 50 is positioned between an end part of the optical waveguide 40 and the light transmitting member 52. The optical waveguide 40 is optically connected to the optical element 10 via the first mirror 50.

A second mirror 60 and a light transmitting member 62 are provided between the optical waveguide 40 and the connector 30. In the second modified embodiment, the second mirror 60 changes a transmission direction of an optical signal output from the optical waveguide 40 to a direction toward the second surface (2b). The light transmitting member 62 is provided on a lower side (the second surface (2b) side) of the second mirror 60. The light transmitting member 62 is optically connected to the housing 34 on the second surface (2b). The optical waveguide 40 is optically connected to the connector 30 via the second mirror 60.

Figure 6:
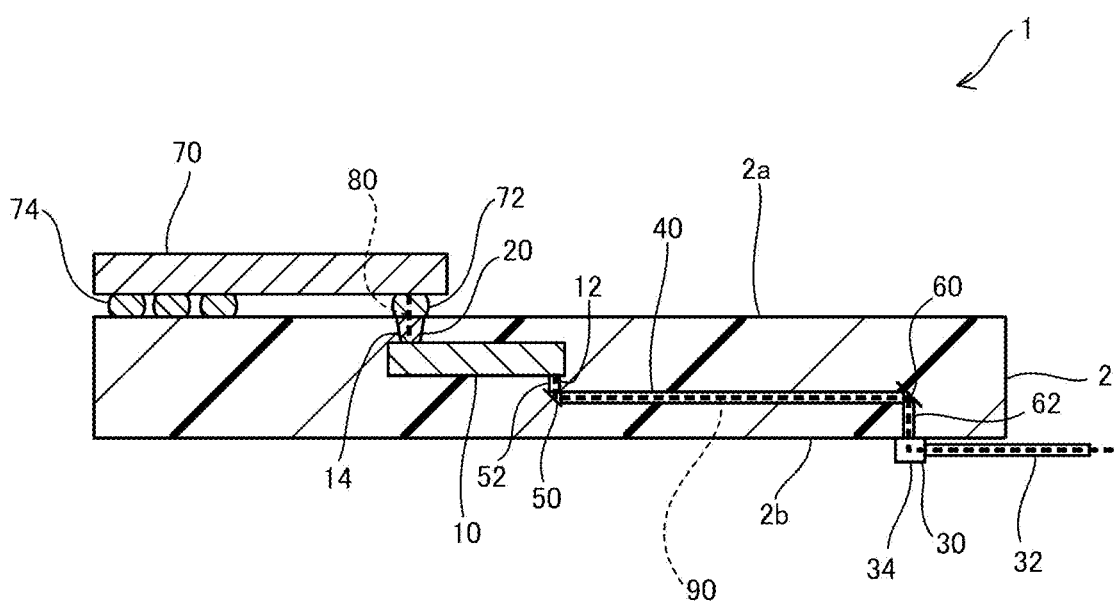
FIG. 6 is a cross-sectional view schematically illustrating an electrical path and an optical path in the semiconductor package of the second modified embodiment according to an embodiment of the present invention.

FIG. 6 illustrates the electrical path 80 and the optical path 90 in the semiconductor package 1 of the second modified embodiment. The electrical path 80 is formed by the metal post 20 and the solder bump 72. The electrical path 80 has a length of, for example, 1 mm or less. The length of the electrical path 80 may be 30 μm or more and 500 μm or less. The optical path 90 is formed by the light transmitting member 52, the first mirror 50, the optical waveguide 40, the second mirror 60, the light transmitting member 62, the housing 34, and the optical fiber 32. The optical path 90 extends along the first surface (2a) at a position on a lower side (the second surface (2b) side) of the optical element 10. In the second modification, the optical fiber 32 extends along the second surface (2b).

Third Modified Embodiment

In a third modified embodiment (not illustrated in the drawings), the optical element 10 and the optical waveguide 40 are optically connected without intervention of the first mirror 50 and the light transmitting member 52 (FIGS. 1-6). The optical input-output part 12 of the optical element 10 is formed on a side surface of the optical element 10. The optical waveguide 40 is positioned on a side of the optical element 10. The optical waveguide 40 extends along the first surface (2a). An end part of the optical waveguide 40 faces the optical input-output part 12 of the optical element 10.

Therefore, the end part of the optical waveguide 40 and the optical input-output part 12 of the optical element 10 are optically connected without intervention of the first mirror 50.

Fourth Modified Embodiment

In a fourth modified embodiment (not illustrated in the drawings), the optical waveguide 40 and the connector 30 are optically connected without intervention of the second mirror 60 and the light transmitting member 62. An end part of the optical waveguide 40 is exposed from a part of the printed wiring board 2. It is not necessary for the optical waveguide 40 to be positioned parallel to the first surface (2a). The housing 34 of the connector 30 faces the exposed end part of the optical waveguide 40. Therefore, the end part of the optical waveguide 40 and the connector 30 are optically connected without intervention of the second mirror 60 and the light transmitting member 62.

In the IC chip mounting substrate of Japanese Patent Application Laid-Open Publication No. 2002-329891, an optical path for optical signal transmission that penetrates the substrate is formed in the substrate. An optical signal input to or output from the optical element is transmitted via the optical path for optical signal transmission. The optical element and the IC chip are electrically connected via solder connection parts, a conductor circuit, via holes, through holes or the like provided in the substrate. Therefore, an electrical signal is transmitted between the optical element and the IC chip via the solder connection parts, the conductor circuit, the via holes, the through holes, or the like.

In the IC chip mounting substrate of Japanese Patent Application Laid-Open Publication No. 2002-329891, the conductor circuit, the via holes, the through holes or the like provided in the substrate function as an electrical path between the optical element and the IC chip. However, in the structure of Japanese Patent Application Laid-Open Publication No. 2002-329891, since the electrical path becomes long (for example, about 200 mm), it is thought that a transmission loss of an electrical signal is large.

A semiconductor package according an embodiment of the present invention includes: a printed wiring board having a first surface and a second surface on the opposite side with respect to the first surface; an optical element that is built in on the first surface side of the printed wiring board and converts an optical signal and an electrical signal; a connector that is mounted on the printed wiring board; an optical waveguide that is formed between the optical element and the connector and optically connect the optical element and the connector; a logic IC that is mounted on the first surface of the printed wiring board; and an electrical path between the optical element and the logic IC. The electrical path has a length of 1 mm or less.

In a semiconductor package according to an embodiment of the present invention, the optical element is built in on the first surface side and the logic IC is mounted on the first surface. Therefore, the electrical path between the optical element and the logic IC has a length of 1 mm or less. The length of the electrical path is made shorter than the length of the electrical path in the conventional semiconductor package. Therefore, according to the semiconductor package of the embodiment, a transmission loss is smaller than that of the conventional semiconductor package.

Obviously, numerous modifications and variations of the present invention are possible in light of the above teachings. It is therefore to be understood that within the scope of the appended claims, the invention may be practiced otherwise than as specifically described herein.

What is claimed is:

1. A semiconductor package, comprising:
    a printed wiring board;
    a logic IC mounted on the printed wiring board;
    a connector mounted on the printed wiring board;
    an optical element accommodated inside the printed wiring board and configured to convert an optical signal to an electrical signal and/or the electrical signal to the optical signal;
    an optical waveguide formed between the optical element inside the printed wiring board and the connector on the printed wiring board such that the optical waveguide optically connects the optical element and the connector;
    a mirror configured to change a transmission direction of the optical signal between the optical waveguide and the optical element such that the optical waveguide is optically connected to the optical element via the mirror; and
    an electrical path formed between the optical element and the logic IC such that the electrical path connects the logic IC and the optical element and that a length of the electrical path is 1 mm or less.

2. The semiconductor package according to claim 1, further comprising:
    a second mirror configured to change a transmission direction of the optical signal between the optical waveguide and the connector such that the optical waveguide is optically connected to the connector via the second mirror.

3. The semiconductor package according to claim 2, wherein the optical waveguide is formed such that the optical waveguide is extending along a surface of the printed wiring board.

4. The semiconductor package according to claim 2, wherein the optical waveguide is formed such that a length of the optical waveguide is in a range of 30 mm to 70 mm.

5. The semiconductor package according to claim 2, wherein the electrical path is formed such that the length of the electrical path is in a range of 30 μm to 500 μm.

6. The semiconductor package according to claim 1, wherein the optical waveguide is formed such that the optical waveguide is accommodated inside the printed wiring board.

7. The semiconductor package according to claim 1, wherein the optical waveguide is formed such that the optical waveguide is extending along a surface of the printed wiring board.

8. The semiconductor package according to claim 1, wherein the optical waveguide is formed such that a length of the optical waveguide is in a range of 30 mm to 70 mm.

9. The semiconductor package according to claim 1, wherein the electrical path is formed such that the length of the electrical path is in a range of 30 μm to 500 μm.

10. The semiconductor package according to claim 1, wherein the electrical path comprises a solder bump mounting the logic IC on a surface of the printed wiring board and a metal post formed in the printed wiring board and on a surface of the optical element.

11. A semiconductor package, comprising:
    a printed wiring board;
    a logic IC mounted on the printed wiring board;
    a connector mounted on the printed wiring board;

an optical element accommodated inside the printed wiring board and configured to convert an optical signal to an electrical signal and/or the electrical signal to the optical signal;

an optical waveguide formed between the optical element inside the printed wiring board and the connector on the printed wiring board such that the optical waveguide optically connects the optical element and the connector;

a mirror configured to change a transmission direction of the optical signal between the optical waveguide and the connector such that the optical waveguide is optically connected to the connector via the mirror; and an electrical path formed between the optical element and the logic IC such that the electrical path connects the logic IC and the optical element and that a length of the electrical path is 1 mm or less.

12. The semiconductor package according to claim 11, wherein the optical waveguide is formed such that the optical waveguide is accommodated inside the printed wiring board.

13. The semiconductor package according to claim 11, wherein the optical waveguide is formed such that the optical waveguide is extending along a surface of the printed wiring board.

14. The semiconductor package according to claim 11, wherein the optical waveguide is formed such that a length of the optical waveguide is in a range of 30 mm to 70 mm.

15. The semiconductor package according to claim 11, wherein the electrical path is formed such that the length of the electrical path is in a range of 30 μm to 500 μm.

16. A semiconductor package, comprising:
a printed wiring board;
a logic IC mounted on the printed wiring board;
a connector mounted on the printed wiring board;
an optical element accommodated inside the printed wiring board and configured to convert an optical signal to an electrical signal and/or the electrical signal to the optical signal;

an optical waveguide formed between the optical element inside the printed wiring board and the connector on the printed wiring board such that the optical waveguide optically connects the optical element and the connector; and an electrical path formed between the optical element and the logic IC such that the electrical path connects the logic IC and the optical element and that a length of the electrical path is 1 mm or less, wherein the electrical path comprises a solder bump mounting the logic IC on a surface of the printed wiring board and a metal post formed in the printed wiring board and on a surface of the optical element.

17. The semiconductor package according to claim 16, wherein the optical waveguide is formed such that the optical waveguide is accommodated inside the printed wiring board.

18. The semiconductor package according to claim 16, wherein the optical waveguide is formed such that the optical waveguide is extending along a surface of the printed wiring board.

19. The semiconductor package according to claim 16, wherein the optical waveguide is formed such that a length of the optical waveguide is in a range of 30 mm to 70 mm.

20. The semiconductor package according to claim 16, wherein the electrical path is formed such that the length of the electrical path is in a range of 30 μm to 500 μm.

* * * * *